Figure 1:
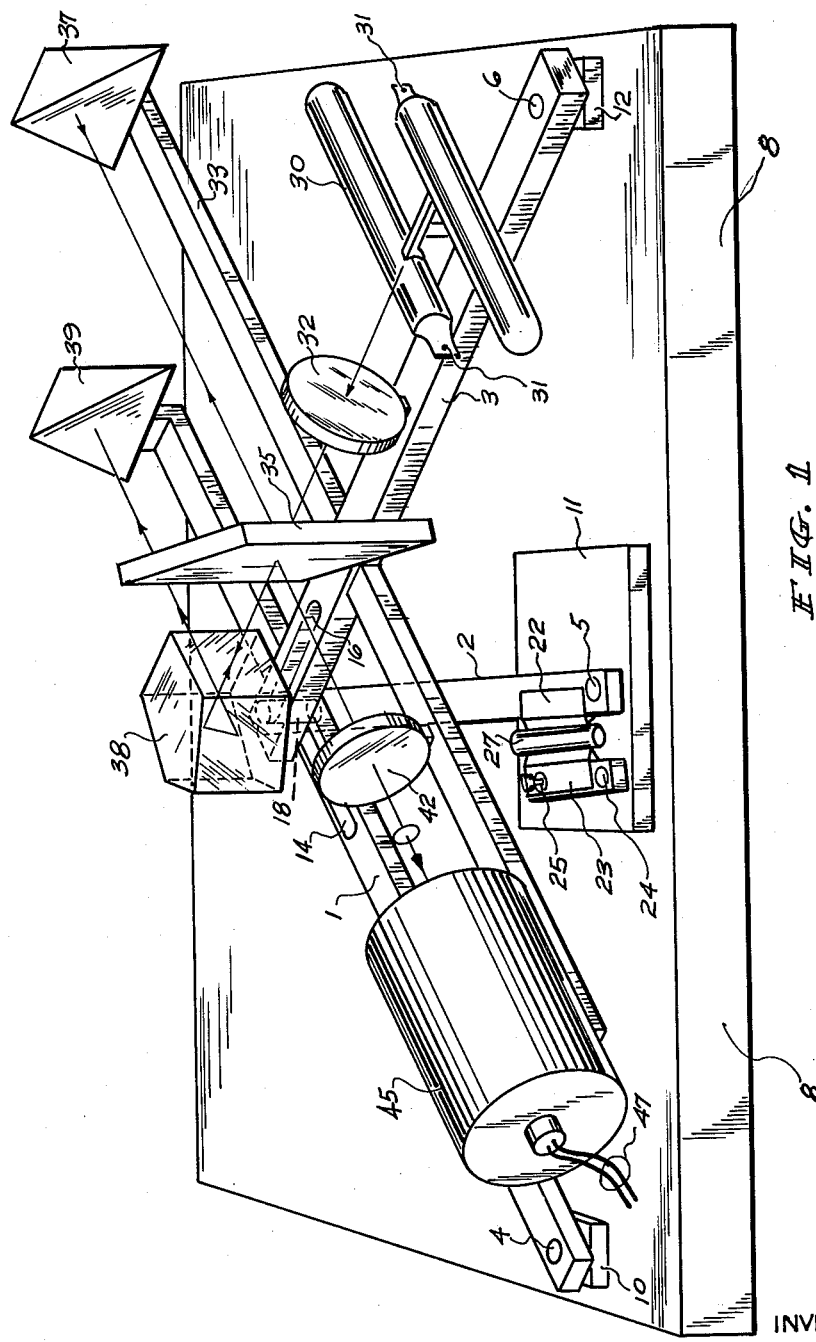

United States Patent Office 3,085,466
Patented Apr. 16, 1963

3,085,466
INTERFERENCE GONIOMETER
Harold S. Hemstreet, Binghamton, N.Y., assignor to General Precision, Inc., a corporation of Delaware
Filed Feb. 6, 1959, Ser. No. 791,694
10 Claims. (Cl. 88—14)

This invention relates to an optional goniometer and more particularly to an optical goniometer of the interferometer type which utilizes the interference fringe patterns produced by two beams of light, of a particular wave length, to obtain precise measurements of angles.

In many instances, it is desirable to make angular measurements with a high degree of precision. Typical examples of where a high degree of accuracy is required is in the measurement of precision made physical objects such as taper pins, taper roller bearings, etc.

Among the prior art instruments which have been used to perform this angular measurement function are the odolites, goniometers, etc. All of these aforementioned instruments make use of an inscribed circle which is divided into degrees and minutes of angle. A vernier dial is provided for reading the angle being measured directly from the circle. The accuracy of such devices is inherently limited due to the mechanical limitations imposed by the inscribed circle and the movable dial. Also, difficulty is experienced by the operators in obtaining readings. Various arrangements have been tried to increase the accuracy of such devices. One of these includes the use of two circles, instead of the previous one, to obtain a difference measurement of the object, and the use of a blade, in place of the vernier dial, which moves in an illuminated field to facilitate the actual reading operation. However, the inherent limit of accuracy of reading of all of the aforementioned devices has been found to be only in the neighborhood of one second of angle, at their most sensitive regions of operation, and the accuracy throughout the full range of calibration is limited to several seconds.

The present invention makes measurements of angles with an accuracy heretofore unobtainable. This is accomplished by the use of an interferometric device which utilizes the interference patterns produced by light of a single wave length. Interferometric devices have previously been used for making measurements of linear dimensions, but heretofore, such devices have not been capable of reading angular movements.

In a typical interferometer used for making linear measurements, a monochromatic light source is provided which produces a small diameter light beam having sharp spectral lines. The light beam is directed toward a collimating lens which spreads the original beam into a wider, parallel beam of light. The parallel beam of light is in turn directed toward a half-reflecting mirror, called a beam-splitter, which is placed at an angle of 45° to the parallel light beam. Half of the light energy passes through the beam-splitter and the other half is reflected by the beam-splitter at an angle of 90° to the source. The reflected light energy is directed toward a first, total reflecting device which is located at a fixed distance from the beam-splitter and the light energy which passes through the beam-splitter is directed to a second total reflecting device. For the purpose of making the measurement, the second total reflecting device is made movable with respect to the beam-splitter. The movable reflecting device is called the measuring head.

The incident light energy is reflected from each of the total reflecting devices and returns to the beam-splitter where it combines to form an interference pattern of light energy whose intensity varies cyclically as a function of the position of the second total reflecting device relative to the beam-splitter. The interference pattern produced, i.e. the number of cycles of the fringes, is a function of the distance obtained in the measurement undertaken. The number of cycles of the interference fringes which are produced as a result of the variable distance is detected by a photosensitive means and is counted by an electronic counter-circuit. The electronic counting circuit eliminates any human error in making the readings. If the wave length of light used is known, the distance of the measurement can readily be determined by a simple mathematical process. In this manner, precise measurements of linear dimensions are obtained.

The present invention utilizes certain of the principles of an interferometer, of the type generally described above, in making a precise measurement of angle. In it, the angular measurement is obtained by converting the angle measured into a linear optical dimension, which may be considered as corresponding to the distance between the second total reflecting device and the beam-splitter. This conversion is accomplished by providing the interferometer with a mechanical linkage and optical system which converts an angular sweep of one of the arms of the linkage into a variation in length of the optical path of one of the beams of light. This variation in length produces the fringe patterns which, when counted by a suitable counting device, provides a measurement of the angle under consideration. By utilizing the mechanical linkage for converting the angular sweep into a change of optical path length, an interference goniometer is provided which is capable of extending the accuracy of reading of angular measurement beyond the several seconds of angle obtainable with previously known devices. Additionally, the subjective error in reading the angle is substantially eliminated since the electronic counting means is utilized. The device of the present invention is also economical to manufacture and requires no more than average skill to operate.

It is therefore an object of this invention to provide an interferometric device for measuring angles.

Another object of this invention is to provide a device for accurately measuring angles by the use of interference fringe patterns.

Another object of this invention is to provide an interferometer which converts angular sweep into a linear change of optical distance so that the amount of angular sweep may be precisely measured.

Figure 2:
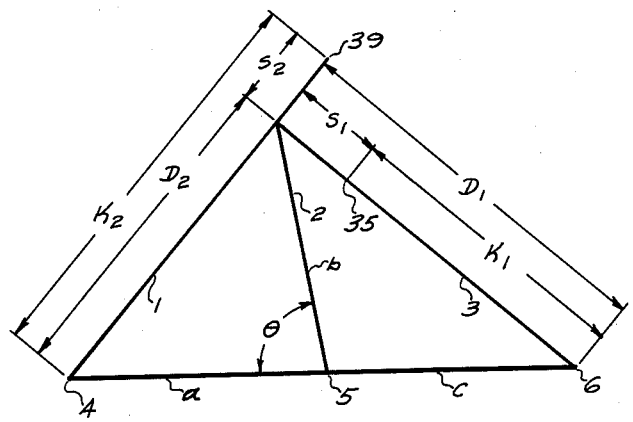
Figure 3:
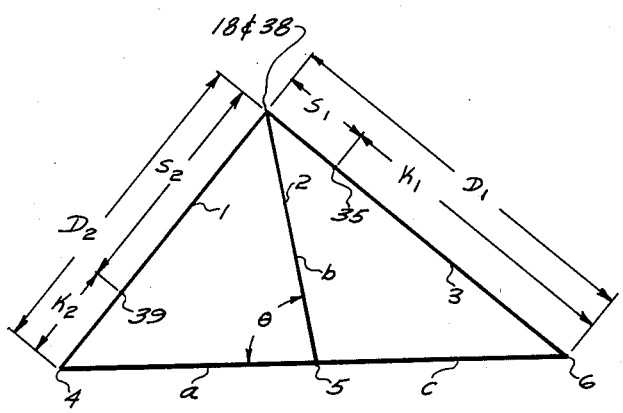

Other objects and advantages of the present invention will become more apparent upon reference to the following specification and annexed drawings in which FIG. 1 is a pictorial view of mechanical and optical systems of the present invention; FIG. 2 is a diagrammatic illustration of the principles of operation of the invention, and FIG. 3 is a diagrammatic illustration of a modified embodiment of the invention.

Referring to FIG. 1, the mechanical linkage of the goniometer is shown as formed by three rigid arms, 1, 2 and 3. Each of the arms, 1, 2 and 3, is pivotally mounted at one end thereof by suitable means such as the respective bearings, 4, 5 and 6, which are arranged equidistant from each other along a straight line. Each of the pivots, 4, 5 and 6, is elevated a different distance from the base plate 8 by means of a respective mounting block, 10, 11 and 12, in order to allow the arms, 1, 2 and 3, to move freely under one another.

The arm 1 has an elongated slot 14 cut in it intermediate its two ends and an elongated slot 16 is also cut in the end of the arm 3 which is opposite the pivot 6. A suitable upwardly extending member, such as a stud 18, is attached to the end of the arm 2 which is opposite the pivot 5. The stud 18 extends into the slots 14 and 16 and guides the motion of the arms 1 and 3 when the arm 2 is moved. In a preferred embodiment, the mechanical linkage is so constructed that the distances between pivots 4 and 5, pivots 5 and 6, and pivot 5 to the stud 18 are equal.

A measuring edge 22 is mounted on the arm 2 near the pivot 5. A second, adjustable reference measuring edge 23 is also mounted on the block 11. If desired, the movable reference measuring edge 23 may be provided at one end with an extension which is pivotally mounted between the block 11 and the arm 2, and at the other end with a suitable device, such as a thumb screw, for securing the measuring edge when measurements are being made. This arrangement provides for greater accuracy and range of adjustability since the reference measuring edge may also be moved. The object 27, whose angle is being measured, is mounted between the two measuring edges 22 and 23. In some typical applications of the invention, arm 2 will be mechanically linked to a shaft (not shown), where the object is to precisely determine the angular position of the shaft.

The optical system of the interference goniometer is formed by a light source 30 which is capable of emitting a small diameter beam of sharp spectral lines of light energy. In a preferred embodiment of the invention, a light source which is capable of producing a yellow krypton line of 5871 Angstroms is used. The light source 30 receives electrical energy from any suitable source (not shown) by means of wires 21. The beam of light energy which is emitted by the light source 30 is directed to a collimating lens 32 which changes the emitted small diameter light beam into a larger diameter parallel light beam.

After passing through the collimating lens 32, the parallel light beam impinges upon one surface (shown hidden in FIG. 1) of a beam-splitter 35 which is affixed to the arm 3 at an angle of substantially 45 degrees to the light source 30 and the collimating lens 32. The beam-splitter 35 is any suitable device, for example, a half silvered mirror, which is capable of dividing the beam of light from the collimating lens 32 into two separate beams of light, each containing half the light energy of the original beam. A fourth rigid arm 33 is mounted on the underside of arm 3, substantially perpendicular to the arm 3 and at point which is approximately beneath the center of the beam-splitter 35.

The beam-splitter 35 reflects half of the incident light energy from the lens 32 towards a cube corner prism reflector 37 which is mounted on the end of the arm 33 at a fixed distance from the beam-splitter 35. The remaining half of the incident light energy is transmitted through the beam-splitter 35 to a penta-prism 38 which is mounted on the stud 18 in a manner so that it is free to move therewith. The penta-prism 38 bends the beam of light which is transmitted through the beam-splitter 35 at an angle of substantially 90 degrees and directs the bent beam toward a second cube corner prism reflector 39 which is mounted at the end of the arm 1. As is well known, a penta-prism is capable of bending a light beam a fixed number of degrees substantially irrespective of the deviation of the prism with respect to the source of light. Therefore, no matter what the orientation of the penta-prism 38 is, with respect to the beam-splitter 35, the incident beam of light will be reflected through an angle of substantially 90 degrees.

The cube corner prisms 37, 39, reflect the light energy which impinges upon them back towards the beam-splitter 35. Mirrors could be used for the cube corner prisms 37 and 39 if desired, however, the use of prisms is preferred since their adjustment angle is not as critical. The light energy which hits the cube corner prism 37 is reflected back to the beam-splitter 35 and again travels the fixed distance. This beam of light passes through the beam-splitter 35 and images upon a lens 42 which is fixed to the arm 33, at a point intermediate the junction of the arms 3 and 33 and the end of the arm 33 opposite the prism 37. The location of the lens 42 is not critical. The beam of light which is reflected by cube corner prism 39 re-enters penta-prism 38 where it is again bent through an angle of approximately 90 degrees and caused to impinge upon the beam-splitter 35. This beam is reflected from the beam-splitter 35 and caused to image upon the lens 42, where it recombines with the beam reflected from cube corner prism 37 to produce interference patterns. A photo-electric pickup device 45 is mounted at the end of the arm 33 to detect the changes in light intensity, fringes, of the recombined beams and a counter (not shown) is connected to the photo-electric pickup device by means of wires 47.

If the distance between the beam-splitter 35 and the cube corner prism 37 and the distance between the beam-splitter 35 and the cube corner prism 39 via penta-prism 38, is equal, no interference fringes are produced at the lens 42, since the two beams of light which image and recombine at lens 42 have both travelled an equal distance in the same medium. When the arm 2 is moved, in order to accomplish a measurement of an angle, the optical distance between the beam-splitter 35 and the cube corner prism 39 varies, and the condition described above is changed, so that interference fringes are produced at the lens 42. This is due to the fact that the transmitted beam of light has to travel a different distance than the beam of light which was reflected by the beam-splitter 35 to the cube corner prism 37. The modulation of light intensity at the lens 42, which is produced by the interference fringes of the two recombined beams, is detected by the photoelectric cell pickup 45 and the number of fringes produced is counted by a counter circuit (not shown) which may be similar to the one shown in the patent to Root, No. 2,604,004. In a preferred embodiment of the invention, an optical arrangement utilizing phase shifted beams of light, similar to the one shown in United States Patent No. 2,977,841, issued April 4, 1961, to John Koffman and Woodrow L. Hayes, which is assigned to the assignee of this invention, may be used. This arrangement enables the counter to make a count of the number of fringes produced, no matter in what direction the arm 2 moves. If the number of interference fringes produced by the change in distance between the beam-splitter 35 and the cube corner prism 39, which was actually produced by a rotation of the arm 2, and the wavelength of the light energy are known it is a simple matter to determine the angle through which the arm 2 has travelled. If a single wavelength of light is used, each count of a fringe made by the counter corresponds to a certain portion of a degree of angle.

In order to explain the operation of the interference goniometer of the present invention, reference is made to FIG. 2 which is a diagrammatic representation of the various elements of the goniometer shown in FIG. 1. In FIG. 2, certain points have been designated with the reference characters which correspond to elements in the pictorial view shown in FIG. 1. The distances between the pivot points 4 and 5, between pivot point 5 and the stud 18, and between pivot points 5 and 6, are respectively designated by the letters $a$, $b$ and $c$. The distance $a$, $b$ and $c$ are all equal and this relationship may be expressed by the equation $a=b=c=r$. The length $K_1$ represents the distance along arm 3 from pivot point 6 to the beam splitter 35. The length $K_1$ is a constant since the beam-splitter 35 is fixedly located on the arm 3. The length $K_2$ represents the distance along arm 1 from the pivot point 4 to the cube corner prism 39. The length $K_2$ is also constant. The angle $\theta$ represents the angle between the arm 2 and a line drawn between pivots 4, 5 and 6. As the arm 2 rotates through the angle to be measured, the angle $\theta$ changes and the point 18, and hence the penta-prism 38, moves on the circumference of a circle having its center at pivot point 5, a radius equal to the length $b(=r)$ and a diameter equal to $a+c(=2r)$. Since the point 18 is actually a stud which slides in the slots 14 and 16 of the arms 1 and 3, it can readily be seen that arms 1 and 3 maintain an angle of 90 degrees at their intersection throughout all positionings of the arm 2, i.e., all angles of $\theta$.

As the arm 2 moves, the penta-prism 38 is moved and the length $S_1$, which is the distance between the beam-splitter 35 and the penta-prism 38, and the length $S_2$, which is the distance between the penta-prism 38 and the cube corner prism 39 changes. As the change in length of $S_1$ and $S_2$ occurs, a change in length $D_1$ and $D_2$ also occurs. $D_1$ is equal to $S_1+K_1$ which is the distance between pivot point 6 and the intersection of arm 3 with arm 1, i.e., the point at which the stud 18 and penta-prism 38 are located. $D_2$ is equal to $K_2-S_2$ and is the distance between the pivot point 4 and the intersection of arms 1 and 3, i.e., the point at which stud 18 and penta-prism 38 are located.

In the diagram of FIG. 2, the arms 1, 2 and 3 of the linkage are shown in an arbitrary position. The following relationships may be derived for any position of the linkage measuring arm 2:

(1) $$D_1 = 2r \cos \frac{\theta}{2}$$

where $r$ is a constant length (2) $$D_2 = 2r \sin \frac{\theta}{2}$$

It therefore follows that:

(3) $$D_1 = S_1 + K_1 = 2r \cos \frac{\theta}{2}$$

where $K_1$ and $K_2$ are constant lengths (4) $$D_2 = K_2 - S_2 = 2r \sin \frac{\theta}{2}$$

Subtracting Equation 4 from Equation 3 we get:

(5) $$S_1 + S_2 = 2r \cos \frac{\theta}{2} - 2r \sin \frac{\theta}{2} - K_1 + K_2$$
$$= -2\sqrt{2}r \sin \left(\frac{\theta}{2} - 45°\right) - K_1 + K_2$$

where $S_1+S_2$ is the distance in optical path length between the beam splitter 35 and the cube corner prism 39. When the arm 2 is rotated to measure an angle, the distance $S_1+S_2$ changes. The beam of light which travels along the distance $S_1+S_2$ is combined with the beam of light which travels the distance from the beam splitter 35 to the cube corner prism 37. If these two distances are not equal, the interference fringes are produced. In this manner the measurements of angles are accomplished.

It is therefore seen that the length $S_1+S_2$, which changes as a function of the movement of the arm 2, varies as a function of the sin of the half angle of $\theta$ and not of the sin of the total angle $\theta$. This means that the optical goniometer of the present invention is twice as sensitive as an interferometer which produces fringes directly as a function of the linear distance moved by the measuring head.

The most sensitive region of the angular sweep for making measurements, may be determined as follows:
Let (6) $$S_1 + S_2 = L$$

then by taking the first derivative of (5)

(7) $$\frac{dL}{d\theta} = -\sqrt{2}r \cos\left(\frac{\theta}{2} - 45°\right)$$

where $dL/d\theta$ is equal to the sensitivity of the instrument. As can be seen, the maximum numerical value of the sensitivity is $\sqrt{2}r$ and occurs when $\theta=90°$, i.e. when the arm 2 is perpendicular to the line joining the pivot points 4 and 6. The sensitivity decreased symmetrically on either side of $\theta=90°$ to a sensitivity of $r$ at $\theta=0°$ and $\theta=180°$. In normal operation, it is usually most convenient to make angular measurements in the most sensitive region of the instrument. Here, the goniometer may be zeroed in, i.e. adjusting the distance $S_1+S_2$ to equal the distance between the beam splitter 35 and the cube corner prism 37, so that the instrument produces no fringes or a known number of fringes, at $\theta=90°$ and measurements made of objects in this region.

To estimate the performance of the goniometer of the present invention, consider a case where the length of the arm 2, and also the distances between pivot points 4 and 5, and 5 and 6, is equal to 10 inches. Using the minimum sensitivity, as derived in Equation 7, of $\sqrt{2}r$ the sensitivity of the goniometer is found to be equal to 14.14 inches per radian. To visualize what this means, consider the gonoimeter of the present invention, when used in conjunction with a device similar to the Fringecount Micrometer, disclosed in application Serial No. 609,467 of J. Kaufmann and W. Hayes, and assigned to the assignee of this invention, which device, is capable of detecting a measuring head movement of 1/20 of the wavelength of the yellow krypton line of 5871 Angstroms. Using the goniometer arrangement of the present invention, 6 fringes per second of angle would be produced, and since each fringe is displayed on a 10-division indicator device by the Fringecount Micrometer, the sensitivity of the goniometer becomes approximately 60 division per second of angle. Stated another way, the sensitivity of the goniometer, when used in the arrangement described above, is approximately 1/60 of a second of angle. As can readily be realized, this is a marked improvement over the accuracy of prior art goniometers which are capable of measuring to only within a few seconds of angle.

Equation 5 shows that the optical distance $S_1+S_2$ varies sinusoidally and that sin ($\theta/2-45°$) is zero when $\theta=90°$. It is necessary to know the absolute value of $\theta$ to make a measurement since the fringecount is a sinusoidal rather than a linear function of the angle thru which arm 2 moves. It is possible to rearrange two components and use the instrument itself to accurately locate the position of arm 2 where $\theta=90°$. To do so the cube corner prism 39 is moved on arm 1 to the position shown in FIG. 3, which is a diagrammatic illustration of this arrangement, and the penta prism 38 is rotated 90° to direct the light from the beam splitter 35 into the cube corner in its new location. The structure shown in FIGURE 1 may be utilized merely by taking the cube corner prism 39 off its bracket and mounting it in the desired position by a suitable fastening means such as a bracket.

From FIG. 3

(8) $$D_2 = S_2 + K_2 = 2r \sin \frac{\theta}{2}$$

(9) $$D_1 = S_1 + K_1 = 2r \cos \frac{\theta}{2}$$

Adding (8) and (9) we get:

(10) $$S_1 + S_2 = 2r \left[\sin \frac{\theta}{2} + \cos \frac{\theta}{2}\right] - (K_1 + K_2)$$

Equation 10 can also be written

(11) $$S_1 + S_2 = 2\sqrt{2}r \cos \left(\frac{\theta}{2} - 45°\right) - (K_1 + K_2)$$

If now we let $S_1+S_2=L$

(12) $$dL/d\theta = -\sqrt{2}r \sin \left(\frac{\theta}{2} - 45°\right)$$

Equations 11 and 12 show that L is a maximum at $\theta=90°$ and decreases if $\theta$ gets either larger or smaller. Thus the position of arm 2 can be set to exactly 90° by observing the fringe count and rotating arm 2 until the fringecount is at this maximum. A more accurate method, however, is as follows: Rotate arm 2 through the $\theta=90°$ position and observe the fringecount reading at its maximum value. Continue to rotate the arm 2 until the fringecount has changed by many counts. All of the fringecount measurements referred to may be made by the Fringecount Micrometer, referred to above. This can be accomplished by making $\theta=70°$ approximately, for example. With arm 2 in this latter position the fringes counted between the maximum count and this latter position can be used, in conjunction with Equation 11 to determine $\theta$ exactly. Without disturbing arm 2, the penta prism 38 and cube corner 39 are returned to their original positions as shown in FIGS. 1 and 2. Arm 2 is now rotated back towards the 90° position and Equation 5 can be used to tell how many fringes should be counted to place arm 2 so that $\theta$ is exactly 90°.

Therefore, it is seen that an optical goniometer has been described which makes precise measurements of angles by the use of the interference fringes of light. The goniometer of the present invention is provided with a mechanical linkage which converts an angular measurement into a linear change of distance. This linear change of distance is used to produce the interference fringes which are counted to determine the angular measurement.

While I have described a preferred embodiment of the invention, it will be understood that I wish to be limited not by the foregoing description, but solely by the claims granted to me.

What I claim is:

1. An optical goniometer comprising a single source of light, means for producing two beams of light from said single source, a first reflecting means located in the path of one of said beams for reflecting said one beam, a second reflecting means located at a variable optical path distance from said beam producing means, optical means located in the optical path between said beam producing means and said second reflecting means for directing the other of said beams onto said second reflecting means, a movable member pivotally mounted at one end thereof for moving said beam producing means and said second reflecting means with respect to each other thereby varying the optical path distance therebetween, said pivotally mounted movable member also moving said optical beam directing means so that said other beam is always directed onto said second reflecting means.

2. An optical goniometer comprising a single source of light, means for producing two beams of light from said single source, a first reflecting means located in the path of one of said beams for reflecting said one beam, a second reflecting means located at a variable optical path distance from said beam producing means for reflecting the other of said beams, means for mounting said second reflecting means at an optical path angle of substantially 90° from the directions of emergence of said other beam from said beam producing means, a movable member pivotally mounted at one end thereof for moving said beam producing means and said second reflecting means with respect to each other thereby varying the optical path distance therebetween, optical means located in the optical path between said beam producing means and second reflecting means for bending said other beam emerging from said beam producing means approximately 90° so that it is directed onto said second reflecting means, said pivotally mounted movable member also moving said beam bending means as it moves so that said other beam is always directed onto said second reflecting means.

3. An optical goniometer comprising a single source of light, means for producing two beams of light from said single source, a first reflecting means located in the path of one of said beams for reflecting said one beam, a second reflecting means located at a variable optical path distance from said beam producing means for reflecting the other of said beams, means for mounting said second reflecting means at an optical path angle of substantially 90° from the directions of emergence of said other beam from said beam producing means, a movable member pivotally mounted at one end thereof for moving said beam producing means and said second reflecting means with respect to each other thereby varying the optical path distance therebetween, optical means located in the optical path between said beam producing means and said second reflecting means for bending said other beam emerging from said beam producing means approximately 90° so that it is directed onto said second reflecting means, said pivotally mounted movable member also moving said beam bending means as it moves so that said other beam is always directed onto said second reflecting means, said beams reflected from said first and second reflecting means being recombined to form a cyclically varying intensity pattern in accordance with the variation in optical path distance between said beam producing means and said second reflecting means, and means for determining the number of cyclical variations in the intensity pattern.

4. A device for measuring angles by the use of interference patterns of light comprising a movable arm pivotally mounted at one end thereof, optical beam bending means located at the other end of said movable arm, first and second arms each pivotally mounted at one end thereof, the distances between the pivot points of said first arm and said movable arm, and said second arm and said movable arm, and said movable arm pivot point and said optical means being equal, means for moving said first and second arms when said movable arm is moved and maintaining an angle of intersection of approximately ninety degrees therebetween, said optical beam bending means being located at said intersection and being moved in accordance with the motion of said movable arm, beam splitter means mounted on said first arm for dividing a beam of light into two beams substantially at right angles to each other, means for mounting a first reflecting means at a reference distance from said beam splitter means for reflecting one of said split beams, and second reflecting means mounted on said second arm for reflecting the other of said split beams which was bent by the optical beam bending means, the optical distance from said beam splitter means to said second reflecting means being varied in accordance with the rotation of said movable arm.

5. A device for measuring angles as set forth in claim 4 wherein said second reflecting means is mounted at the end of said second arm opposite the pivotal mounting.

6. A device for measuring angles as set forth in claim 4 wherein said second reflecting means is located between the pivotal mounting of said second arm and said optical beam bending means.

7. A device for measuring angles as set forth in claim 4 wherein said reflected beams are recombined to form a pattern which is cyclically varying in intensity in accordance with the variation in distance between said optical beam bending means and said second reflecting means and means for determining the number of cyclical variations of intensity thereby determining the angle travelled by the movable arm.

8. A device for measuring angles by the use of interference patterns of light comprising a movable arm pivotally mounted at one end thereof, first and second arms each pivotally mounted at one end thereof, means for moving said first and second arms when said movable arm is moved, beam splitter means mounted on said first arm for dividing a beam of light into two beams, means for mounting a first reflecting means at a fixed distance from said beam splitter means for reflecting one of said split beams, a penta-prism associated with said movable arm for bending the other of said split beams, and second reflecting means mounted on said second arm for reflecting the other of said split beams which is bent by the beam splitter means, the optical distance from said beam splitter to said second reflecting means being varied in accordance with the rotation of said movable arm.

9. A device for measuring angles by the use of interference patterns of light comprising a movable arm pivotally mounted at one end thereof and having an upwardly extending member at its other end, first and second arms each pivotally mounted at one end thereof, the distances between the pivot points of said first arm and said measuring arm, and said second arm and said measuring arm, and the distance between the pivot points of said movable arm and said upwardly extending member being equal, said first arm having an elongated slot at the end opposite the pivotal mounting, and said second arm having an elongated slot intermediate its ends, said upwardly extending member of said movable arm being slidably positioned in said slots to move said first and second arms when said movable arm is moved and maintaining an angle of approximately ninety degrees between said first and second arms at their intersection, beam splitter means fixedly mounted on said first arm for dividing a beam of light into two beams substantially at right angles to each other, means for mounting a first reflecting means at a fixed distance from said beam splitter means for reflecting one of said split beams, a penta-prism mounted on said upwardly extending member for bending the other of said split beams through an angle of approximately ninety degrees, and second reflecting means mounted on said second arm at a point between the longitudinal slot and the end of the arm opposite the pivot for reflecting the other of said split beams which was bent by the beam splitter means, the distance from said beam splitter to said second reflecting means being varied in accordance with the rotation of said movable arm.

10. A device for measuring angles by the use of interference patterns of light comprising a movable arm pivotally mounted at one end thereof and having an upwardly extending member at its other end, first and second arms each pivotally mounted at one end thereof, the distances between the pivot points of said first arm and said measuring arm, and said second arm and said measuring arm, and the distance between the pivot points of said movable arm and said upwardly extending member being equal, said first arm having an elongated slot at the end opposite the pivotal mounting, and said second arm having an elongated slot intermediate its ends, said upwardly extending member of said movable arm being slidably positioned in said slots to move said first and second arms when said movable arm is moved and maintaining an angle of approximately ninety degrees between said first and second arms at their intersection, beam splitter means fixedly mounted on said first arm for dividing a beam of light into two beams substantially at right angles to each other, means for mounting a first reflecting means at a fixed distance from said beam splitter means for reflecting one of said split beams, a penta-prism mounted on said upwardly extending member for bending the other of said split beams through an angle of approximately ninety degrees, and second reflecting means mounted on said second arm at a point between the longitudinal slot and the pivot end thereof for reflecting the other of said split beams which was bent by the beam splitter, the distance from said beam splitter to said second reflecting means being varied in accordance with the rotation of said movable arm.

References Cited in the file of this patent

UNITED STATES PATENTS

| | | |
|---|---|---|
| 1,253,308 | Twyman et al. | Jan. 15, 1918 |
| 2,571,937 | Peck | Oct. 16, 1951 |
| 2,795,991 | Tuzi | June 18, 1957 |
| 2,841,049 | Scott | July 1, 1958 |
| 2,866,377 | Rantsch | Dec. 30, 1958 |

FOREIGN PATENTS

| | | |
|---|---|---|
| 1,153,098 | France | Sept. 23, 1957 |